E. REAGAN.
ROLLER PRESS.
APPLICATION FILED JULY 7, 1906.

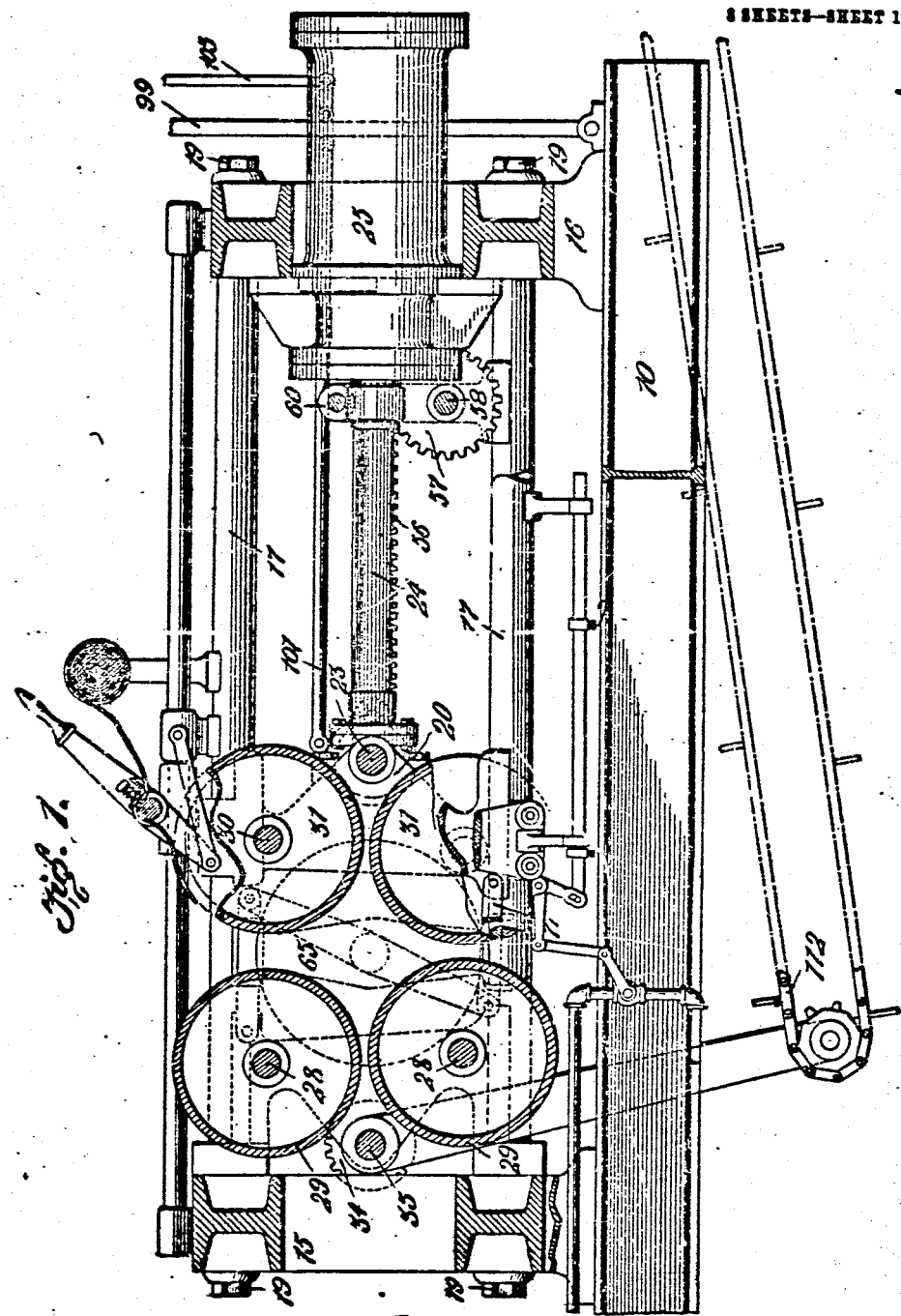

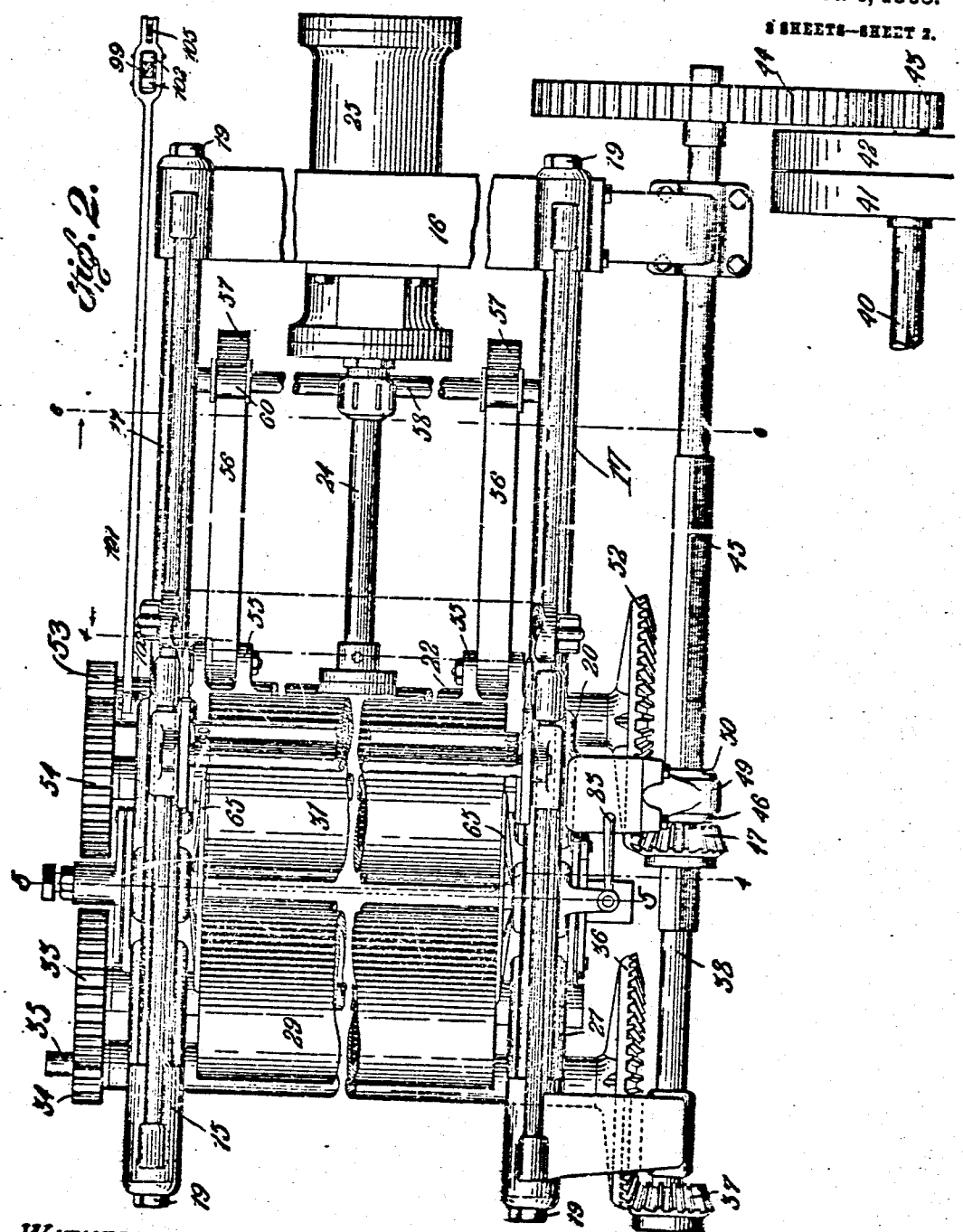

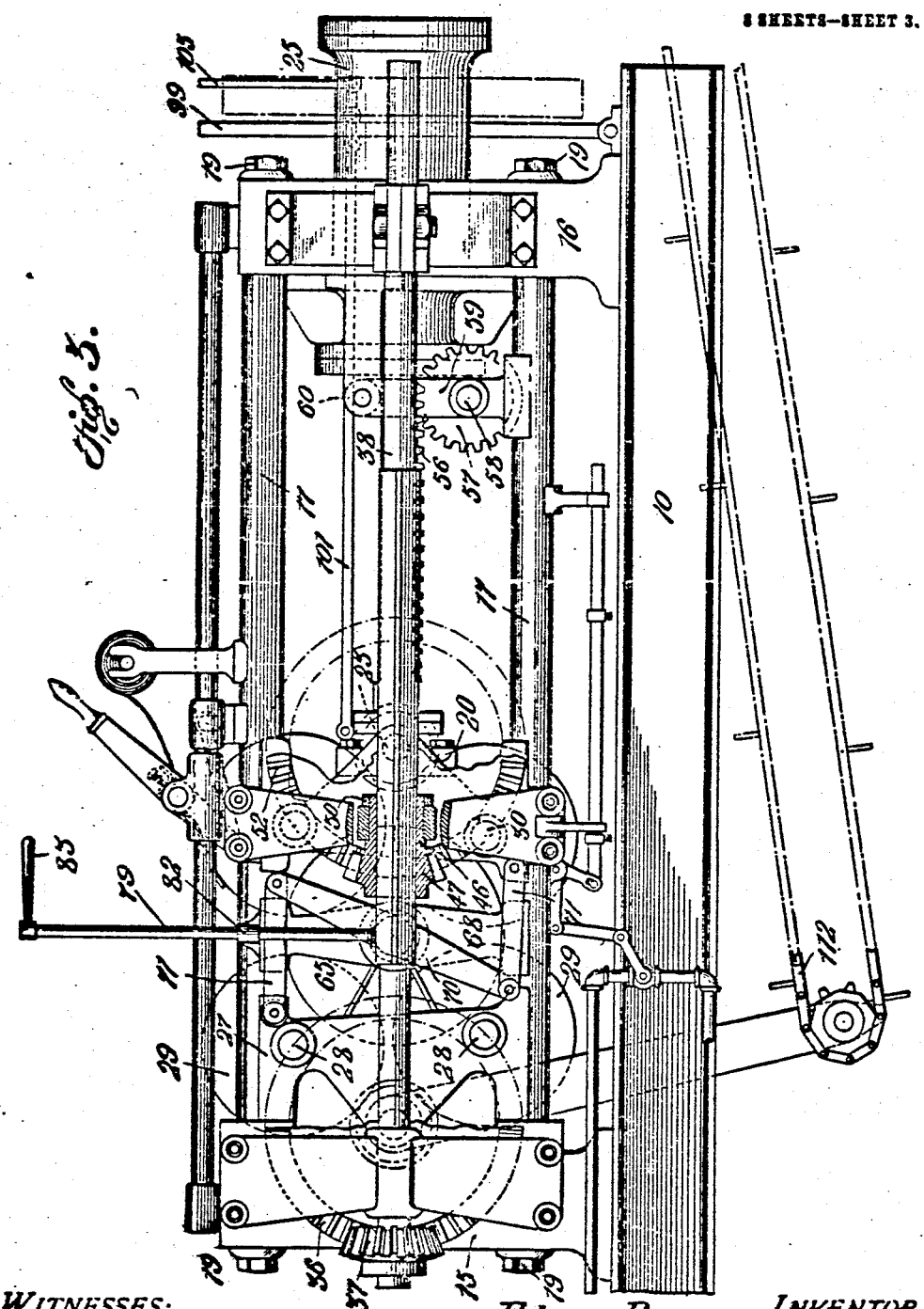

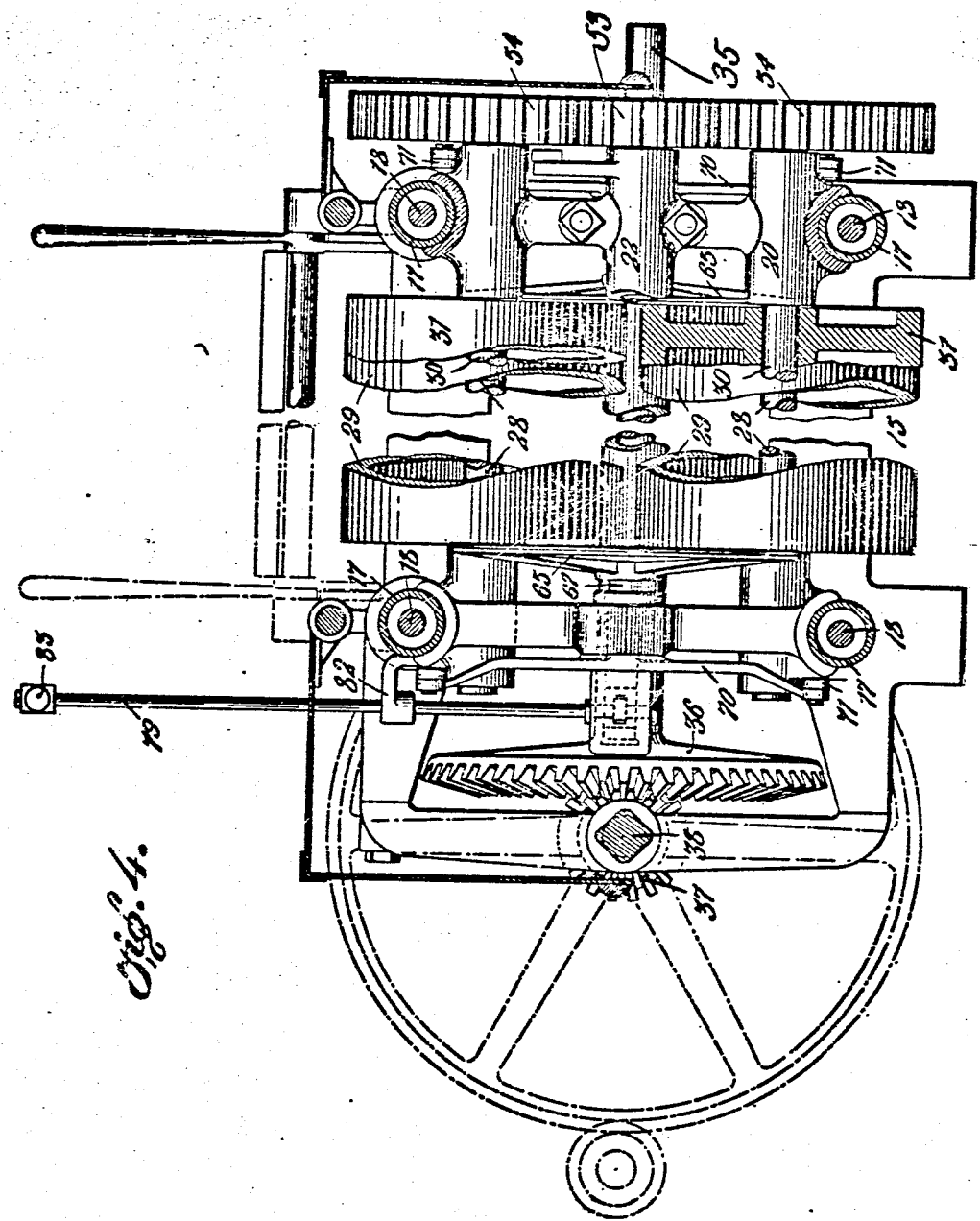

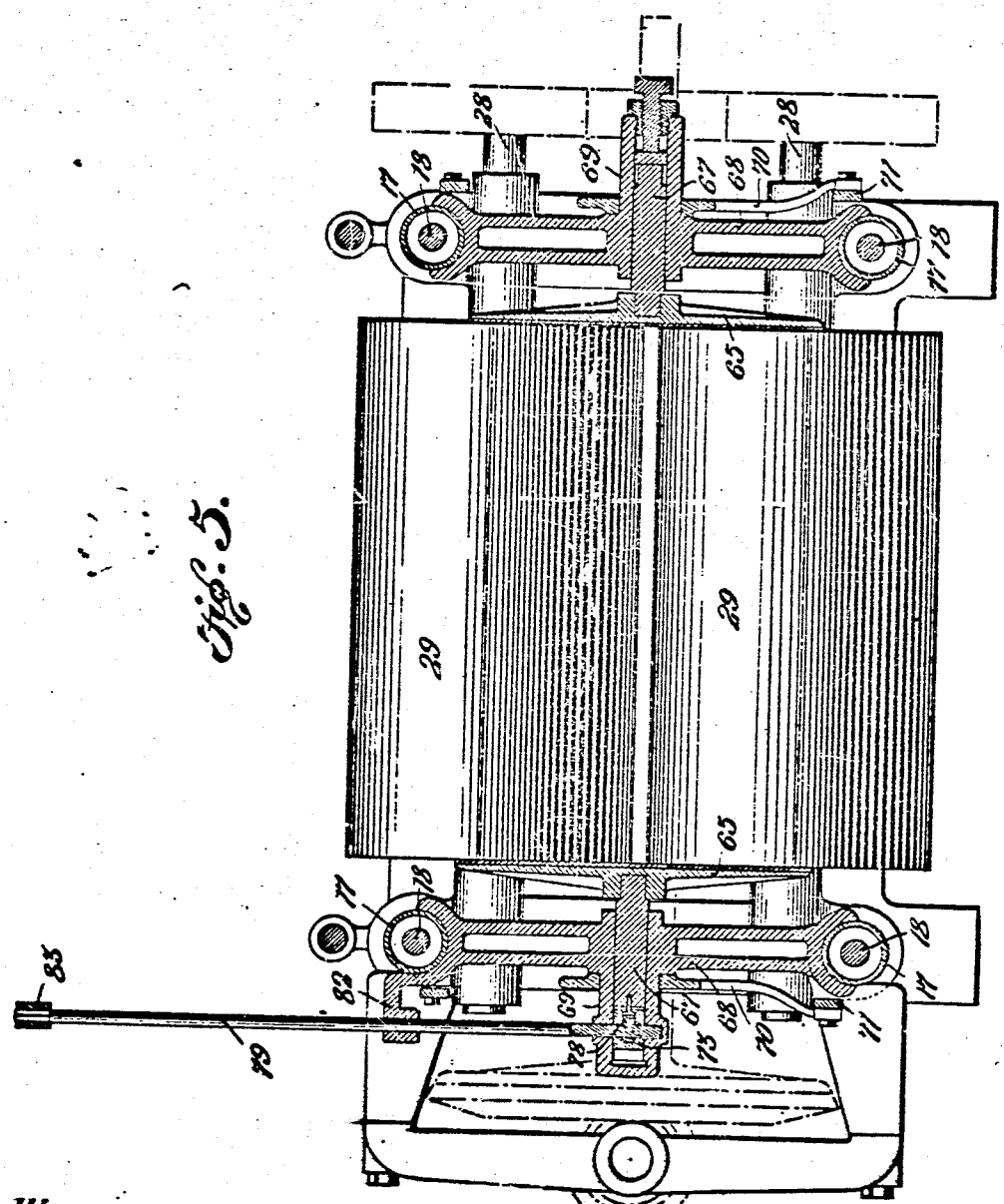

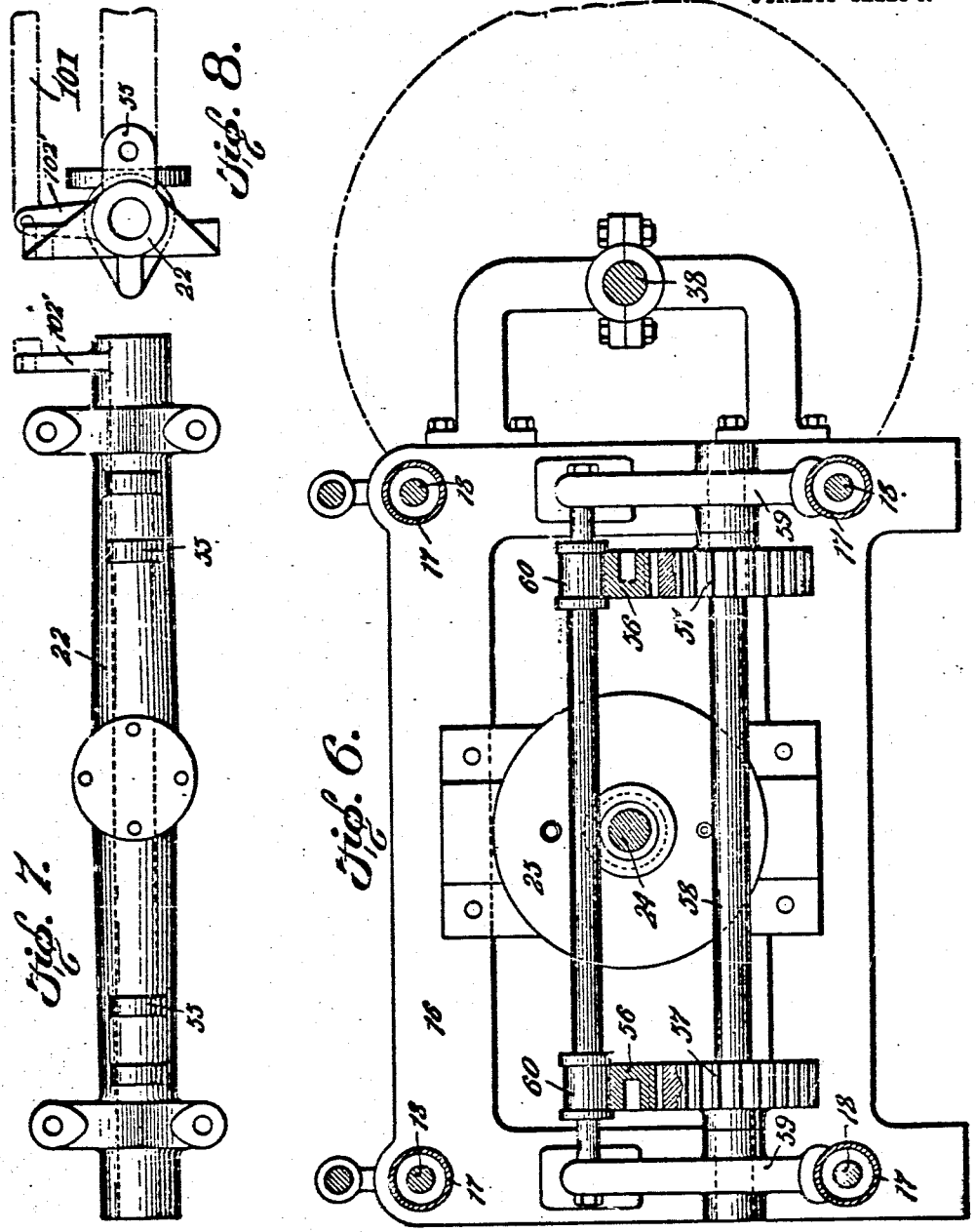

900,205.

Patented Oct. 6, 1908.
8 SHEETS—SHEET 7.

WITNESSES:

Edgar Reagan, INVENTOR.
By C. A. Snow & Co.
ATTORNEYS

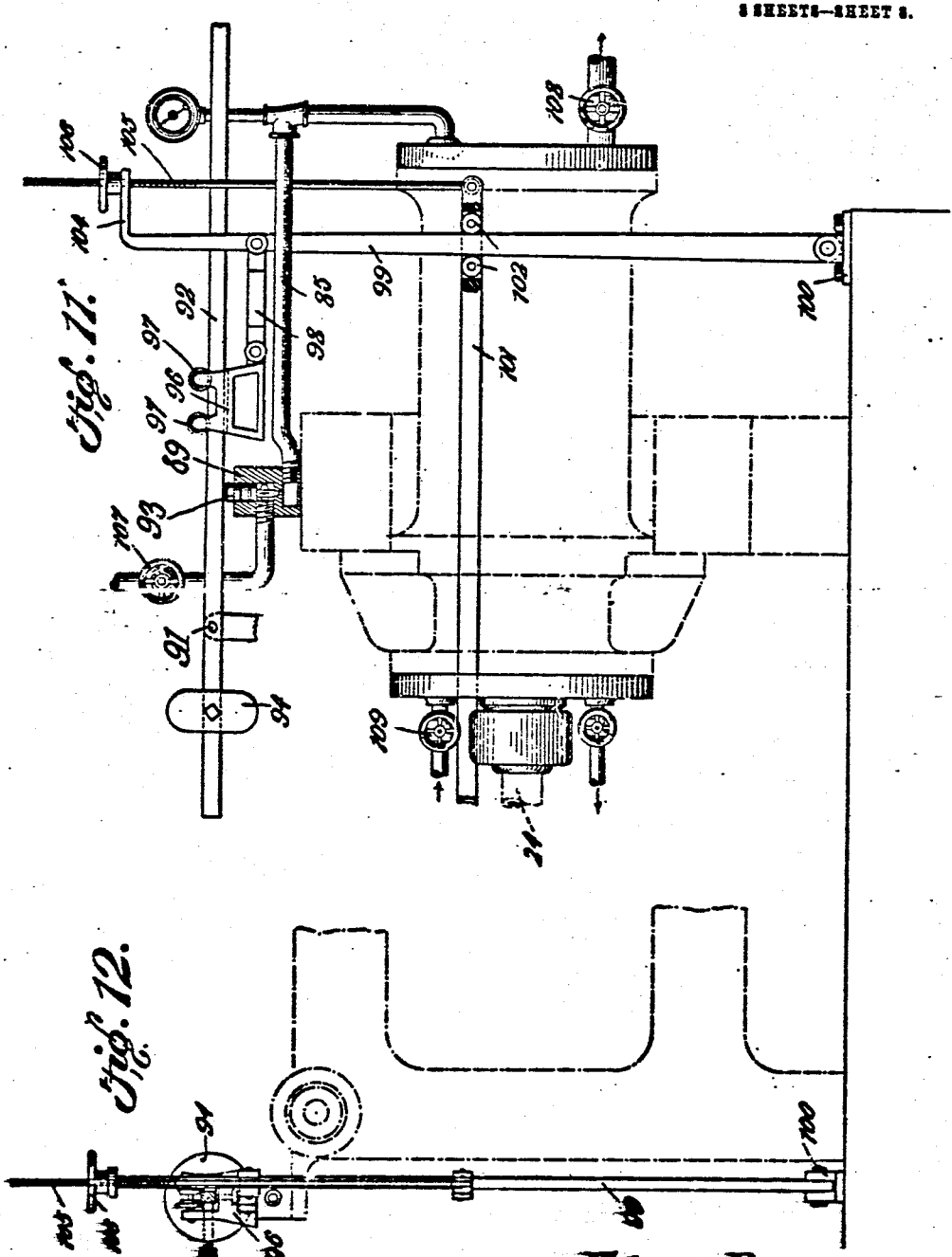

UNITED STATES PATENT OFFICE.

EDGAR REAGAN, OF SAN ANTONIO, TEXAS, ASSIGNOR, BY MESNE ASSIGNMENTS, TO REAGAN BALE COMPANY, OF SAN ANTONIO, TEXAS.

ROLLER-PRESS.

No. 900,205.  Specification of Letters Patent.  Patented Oct. 6, 1908.

Application filed July 7, 1906. Serial No. 325,122.

*To all whom it may concern:*

Be it known that I, EDGAR REAGAN, a citizen of the United States, residing at San Antonio, in the county of Bexar and State of Texas, have invented a new and useful Roller-Press, of which the following is a specification.

This invention relates to roller presses for the formation of round or cylindrical cotton bales, and has for its principal object to provide a press of simple construction by means of which a bat of cotton or other material may be wound under any desired pressure into the form of a cylindrical bale.

A further object of the invention is to provide a press of this type in which the compression force is automatically increased during the formation of the bale, the outer layers being condensed to a much greater extent than the inner layers and core portion of the bale.

A still further object of the invention is to provide a baling press that is arranged to receive a wound core or small bale, and to wind on the same a bat of any desired length and condensed to any desired extent.

A still further object of the invention is to provide a novel form of end or head plate for engagement with the end portion of the bale, said plate being arranged to revolve with the bale, so that there is no friction such as might tend to destroy or impair the value of the cotton, the ends of the bale being left in such condition as to permit examination of all parts of the bale.

A still further object of the invention is to provide improved means for supporting the end or head plate, and for moving the same toward and from the ends of the bale.

A still further object of the invention is to provide improved means for preventing uneven or irregular movement of the housings of the movable compression rolls during the progress of forming the bale.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 9:
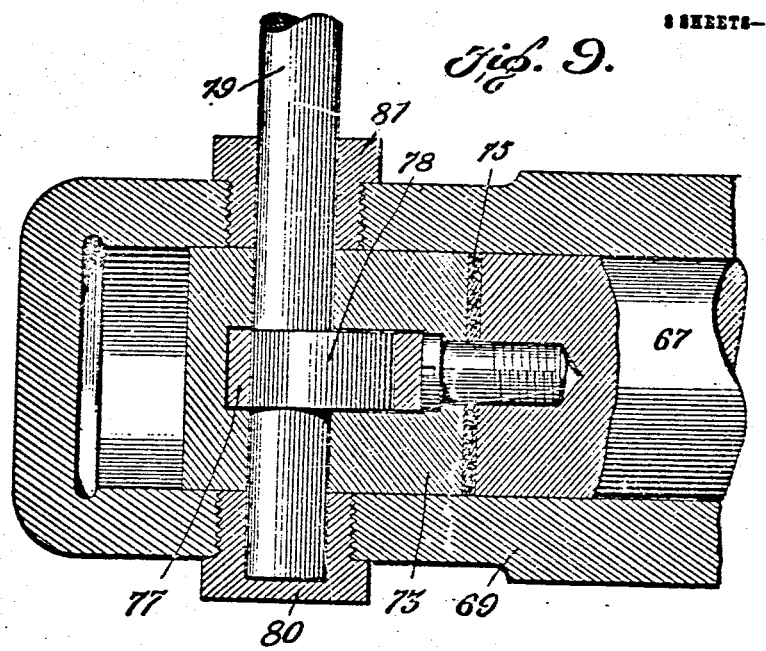
Figure 10:
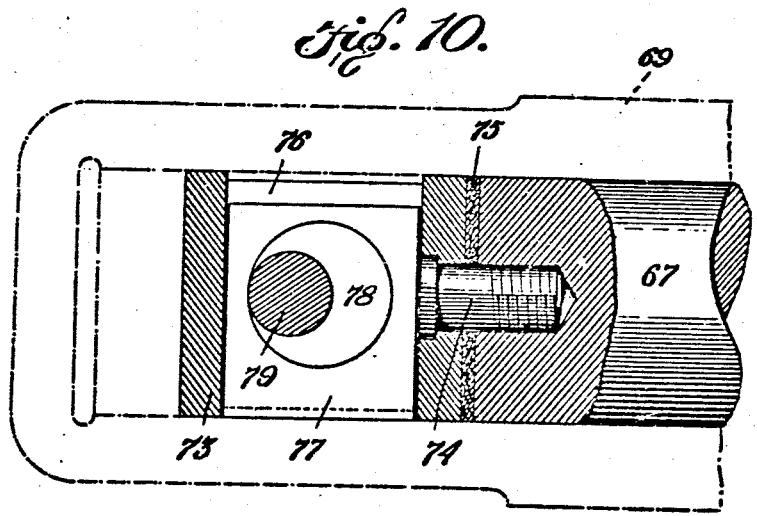

In the accompanying drawings:—Figure 1 is a longitudinal sectional elevation of a baling press constructed in accordance with the invention. Fig. 2 is a plan view of the same. Fig. 3 is a side elevation of the press, parts being broken away in order to more clearly illustrate the construction. Fig. 4 is a vertical section of the press on the line 4—4 of Fig. 2. Fig. 5 is a similar view on the line 5—5 of Fig. 2. Fig. 6 is a transverse section of the machine on the line 6—6 of Fig. 2. Fig. 7 is a rear elevation of the connecting bar of the movable housings. Fig. 8 is an end elevation of the same. Fig. 9 is a vertical sectional view of the mechanism for adjusting the position of the movable end or head plate. Fig. 10 is a sectional plan view of the same. Fig. 11 is a side elevation, illustrating particularly the means for automatically regulating the pressure on the bale. Fig. 12 is an end view of the same.

Similar numerals of reference are employed to indicate corresponding parts throughout the several figures of the drawings.

The press is mounted on a suitable base 10, formed of I beams or the like, said base carrying a pair of end frames or standards 15 and 16 which are connected to each other by four longitudinal bars 17, these bars being preferably hollow and serving in part as spacing sleeves which surround bolts 18, the ends of the bolts extending through suitable openings formed in the housings and carrying clamping nuts 19 which may be turned tightly against the outer faces of the end plates.

Mounted slidably on the tubes 17 are movable housings 20 which are connected together by a transversely disposed bar 22, said bar being hollow for its entire length, and having bearings for the reception of a transversely disposed shaft 23 through which motion is imparted to the compression rolls carried by said movable housings.

Secured to the central portion of the bar 22 is a piston or plunger rod 24 carrying a piston or plunger that is arranged within a cylinder 25 that is rigidly secured to the fixed housing or end frame 16, and provision is made for admitting a fluid or liquid to the cylinder under any desired pressure for the purpose of holding the compression rolls of the movable housing in engagement with the bale being formed. The frame tubes 17 also serve as supports for fixed housings 27, and these housings are provided with bearings for the support of roller shafts 28 on which are mounted compression rollers 29, while the movable housings are provided with bearings for the support of roller shafts 30 on which are mounted compression rolls 31, these four rolls being arranged to form a baling chamber into which the bat is conducted and wound under any pressure into the form of a cylindrical bale. During this operation the rolls carried by the movable housings move backward under the gradually accumulating material of which the bale is formed, and this backward movement is resisted by the pressure of the fluid within the cylinder 25, so that the material will be tightly compressed. Provision is also made for adjusting the degree of pressure, so that a bale of any density may be formed.
At one end of each of the shafts 28 is a gear wheel 33, and these two gear wheels intermesh with a pinion 34 that is arranged at one end of a shaft 35 adapted to suitable bearings in the two fixed housings. At the opposite end of the shaft 35 is a large bevel gear 36 which intermeshes with a pinion 37 mounted on the main shaft 38. The shaft 38 is mounted in suitable bearings formed in brackets projecting from the fixed end frames 15 and 16 at one side of the machine, and is connected to any suitable driving mechanism, this mechanism in the present instance being shown in the form of a driving shaft 40 having tight and loose pulleys 41 and 42, and provided with a pinion 43 which intermeshes with a gear 44 on the shaft 38. This shaft 38 is provided with a portion of rectangular or other non-circular form in cross section, the non-circular portion 45 extending alongside the movable housings and receiving the elongated hub 46 of a bevel pinion 47, the hub and pinion being provided with an opening of a contour corresponding to the cross sectional contour of this portion of the shaft.
The elongated hub 46 is slightly reduced in diameter at one end, and extends through a circular opening formed in a bracket 49 that projects from one of the movable housings, and is held in place by a collar or ring 50 that is firmly secured to the end of the hub and bears against the rear face of the bracket. This bracket, therefore, will act as an additional bearing or support for the shaft 38, and the bevel gear 47 will be compelled to move to and fro with the movable housings, while at the same time remaining in operative engagement with the shaft, so that movement will be transmitted to the bevel pinion no matter what the position of the housings may be. The bevel pinion 47 intermeshes with a bevel gear 52 that is arranged at one end of the shaft 23. At the opposite end of the shaft 23 is a spur pinion 43 that intermeshes with a pair of gears 54, that are keyed or otherwise secured to the roll shafts 30.

The construction and arrangement of the gearing connections are such that all of the rolls will be constantly driven, so long as the shaft 38 rotates, and during this movement the movable housings are free to move outward from the fixed housings as the bale gradually increases in size, without disturbing the driving connections. The rolls are all rotated in the same direction with reference to the bale being formed, and have equal surface speeds.

In this class of devices there is more or less tendency to irregular movement of the movable housings due to unevenness in the thickness of the bat, or to unequal friction or resistance to the movement of the two housings. In order to correct this and prevent the binding or clamping of the housings on the guides, the connecting bar 22 of the movable housings is provided near each end with pivot lugs 55 to which are connected rack bars 56. The rack bars 56 engage with a pair of pinions 57 that are rigidly secured to a transversely disposed shaft 58, the latter being mounted in bearings formed in a pair of brackets 59 that are firmly secured to the end frame 16, and the lowermost frame tubes 17. The racks are held down in engagement with the gears 57 by rollers 60, so that they remain in constant mesh, and any rearward movement of one housing will act through the rack bar nearest that housing to turn the shaft 58 and the movement will be transmitted through the opposite rack bar to the second housing, so that under all circumstances the axes of the four compression rolls will remain in parallel relation.

One of the principal difficulties encountered in the operation of roller presses is in maintaining the ends of the bales perfectly straight, and without injuring the cotton. Where the ends of the bale are held against friction plates, the cotton is injured and discolored, and in some cases the friction may be sufficient to cause fire, but in any event it is difficult to determine the grade and value of the cotton by an examination of the end of the bale.

In carrying out the present invention, provision is made for maintaining the ends of the bale in perfectly straight lines without any injury or discoloration of the cotton, so that false packing may be instantly detected and samples may be taken from any part of the bale. To accomplish this, the ends of the bale are engaged by small revoluble end disks 65, the inner faces of which are lined with vulcanized fiber or similar material in order to prevent contact between the cotton and the metal of the disks, so that no discoloration from oxid of iron can result. These disks are free to revolve with the bale being formed, and provision is made for maintaining their axes of rotation in the same plane as the axis of rotation of the bale. One or both of these disks may be arranged to move outward from the end of the bale after the bale forming operation, in order to permit the discharge of the bale from the press. The disks are carried by short shafts 67 which find bearings in two slidable frames 68 that are carried by the frame tubes 17. Each of these slidable frames is provided with an extended hub 69 which passes through an opening formed at the center of an equalizing lever 70, the opposite ends of which are connected respectively to the fixed and movable housings by links 71, and as the arms of each lever are of equal length, and the point of connection with the housings is equidistant from the axes of the disks, said disks will be maintained with their axes at the point of intersection of diagonals connecting the axes of the four rolls. As the disks are free to rotate with the bale, there is no friction whatever between the ends of the bale and the disks and the cotton cannot be injured by contact with said disks.

It is necessary that one of the disks be arranged to move outward in order to free the bale and permit its discharge from the press, and for this purpose one of the extended hubs 69 is provided with a cylindrical block 73 of the same diameter as the shaft 67, and connected thereto by a screw 74 in such manner that the block 73 may remain stationary while the shaft 67 revolves with the disk. In order to reduce friction, a suitable packing disk 75 is introduced between the end of the shaft and the block. The cylindrical block is provided with a diametrically arranged slot 76 that is arranged for the reception of a rectangular block 77 that has an opening to receive an eccentric 78. The eccentric is secured on a vertical shaft or spindle 79, the lower end of which is seated in an opening formed in a plug 80 that is secured to a threaded opening of the hub 69, and also extends through a guiding opening formed in a similar plug or ring nut 81. The shaft or spindle is further guided by an opening formed in a bracket arm 82 projecting from the frame 68, and at the upper end of said shaft or spindle is an operating handle 83 which may be turned, after the bale is ready to be discharged. The turning of the shaft or spindle to the extent of half a revolution will act through the eccentric 78 and block 77 to move the cylindrical block 73 outward and this will draw the shaft 67 and the end disk carried thereby away from the end of the bale, so that the latter may be discharged from the press when the movable rolls have been drawn rearward to allow the bale to drop down from the baling chamber. While only one of the disks has been shown as movable toward and from the end of the bale, it is obvious that both disks may be so constructed if desired.

During the bale forming operation, the movable housings are held up with their rolls in engagement with the bale by the action of a fluid under pressure which is admitted to the rear end of the cylinder through a pipe 85. In this pipe is a pressure regulating valve 89 (Fig. 11) which may be of any ordinary construction, and provision is made for automatically increasing the pressure of the fluid admitted to the cylinder as the bale forming operation progresses. it being deemed advisable to subject the bale to gradually increased pressure until the baling operation is completed.

Mounted on a suitable pivot 91 is a lever 92, one arm of which bears on the stem 93 of the pressure regulating valve 89. The opposite arm of the lever carries an adjustable weight 94 which tends to relieve the downward pressure of the valve stem. On the first arm of the lever is mounted an adjustable weight 96 which may be provided with suitable carrying rollers 97 to reduce friction. This slidable weight tends to move the stem of the regulating valve downward and allow increase in pressure in the cylinder. The slidable weight is connected by a link 98 to a lever 99 that is pivoted on a lug or bracket 100 carried by the base of the machine. The lever 99 is engaged by a rod 101 that is provided with a pair of anti-friction rolls 102 engaging against the opposite sides of said lever. The forward end of the rod 101 is connected to a bracket arm 102' (Fig. 8) that is carried by the cross bar 22 of the movable housings, and as the housings move back during the gradual increase in diameter of the bale, movement will be transmitted through the rod 101 to the lever 99 and the movable weight 96 will be moved outward from the fulcrum point of the lever, gradually increasing the leverage force and the weight which is imposed on the stem 93 of the regulating valve so that the latter will be compelled to open to a greater extent than it would under the pressure of the fluid alone, and this will result in gradual increase in pressure in the cylinder, so that as the bale increases in size, the pressure will be increased in proportion.

The density of the bale may be increased or decreased by adjusting the degree of pressure of the fluid within the cylinder and by adjusting the point at which the increase of pressure commences. This adjustment is accomplished by altering the point of connection between the rod 101 and the lever 99. If the point of connection of the lever 101 is near the fulcrum of the lever 99, the weight 96 will be moved to a greater extent during the formation of the bale than it would during the formation of a bale of the same size if the point of connection were distant from the fulcrum. The upper end of the lever 99 is turned to form an arm 104 having an opening for the passage of a rod 105, the lower end of which is pivotally connected to the rod 101. The upper end of the rod 105 is threaded for the reception of a nut 106 which may be turned for the purpose of raising or lowering the rod 101, and adjust its point of connection with the lever 99.

After the bale is completed, and it is desired to discharge the same from the press, the controlling valve 107 in the main inlet pipe is closed, and an exhaust valve 108 is opened, allowing the fluid to escape from the rear end of the cylinder. An inlet valve 109 may then be opened to allow fluid under pressure to enter the front end of the cylinder and force the piston back for the purpose of withdrawing the movable housings and opening the baling chamber to an extent sufficient to allow the complete bale to drop down between the lowermost rolls.

The finished bale falls on an endless conveyer 112 by which it may be carried to a weighing scale or other suitable point.

I claim:—

1. In a baling press, the combination with a plurality of compression rolls, a fluid pressure means for resisting outward movement of one of them as the diameter of the bale increases, automatic means for effecting gradual increase in the pressure exerted on the bale as the diameter of the bale gradually increases, and means for adjusting the period and extent of such increased pressure.

2. In a baling press, a plurality of rolls, movable housings carrying one pair of rolls, a cylinder, a piston arranged therein and connected to the movable housings, a fluid pressure supply pipe connected to the cylinder, a pressure regulating valve connected to said pipe, a lever bearing on the stem of the valve, a slidable weight carried by the lever, a pivotally mounted intermediate lever connected to the weight, a bar extending from the movable housings and connected to the intermediate lever, and means for varying the point of connection between the bar and the intermediate lever to thereby alter the period and extent of movement of the weight.

3. In a baling press, a plurality of pairs of rolls, movable housings carrying one pair of rolls, a fluid pressure cylinder, a piston arranged therein and connected to the movable housings, a fluid pressure supply pipe leading to the cylinder, a pressure regulating valve connected in the pipe, and a lever having two arms, one of which is arranged to engage the stem of the valve, an adjustable weight tending to prevent active movement of the lever against the valve stem, a slidably mounted weight tending to force the lever into engagement with the stem and open the valve, a lever connected to the weight, and a rod extending from one of the housings and connected to said lever.

4. In a roller press, the combination with a plurality of pairs of rolls, of movable housings carrying one pair of rolls, a fluid pressure cylinder, a piston arranged therein and connected to the housings, a pressure supply pipe leading to the cylinder, a pressure regulating valve in said supply pipe, a lever engaging the stem of the valve, a movable weight on said lever, a second lever having an elongated connection with the weight, an arm extending from said second lever, a rod connected to one of the housings and slidably connected to the second lever, a threaded rod extending between the connecting rod and the arm, and an adjusting nut on said threaded rod to alter the connection between the connecting rod and the second lever.

5. In a roller press, a plurality of rolls, housings carrying the rolls and movable relatively to each other, a pair of slidable brackets arranged between the housings, a pair of alining shafts journaled in the brackets, one of said shafts being movable in the direction of its length, freely revoluble disks carried by the shafts and arranged to engage with the opposite ends of the bale, a cylindrical block mounted in one of the brackets and connected to the movable shaft, and a cam for imparting endwise movement to said block.

6. In mechanism of the class described, the combination with an end disk, of a shaft carrying the same, a shaft support, a cylindrical block carried by the support in alinement with the shaft, said block being provided with a recess and with a spindle receiving opening, a rectangular block arranged within the recess and having an eccentric receiving opening, a spindle, and an eccentric carried by the spindle and arranged within said opening, whereby longitudinal movement may be imparted to the shaft by the turning of the spindle.

7. In mechanism of the class described, the combination with an end disk or hub, of a shaft carrying the same, a shaft support, a cylindrical block arranged within the support and connected to the shaft, a spindle extending through the support and the block, an eccentric carried by the spindle, and a rectangular block carried by the cylindrical block and having an opening for the reception of said eccentric.

8. In a roller press, a frame, a pair of movable housings, rolls carried by said housings, a cross bar forming a connection between the two movable housings, a pair of rack bars mounted for pivotal motion on said cross bar, a shaft extending transversely of the machine, a pair of gears rigidly secured to the shaft and with which said racks intermesh, and a pair of rack guiding rollers arranged to hold the racks in constant engagement with said gears.

In testimony that I claim the foregoing as my own, I have hereto affixed my signature in the presence of two witnesses.

EDGAR REAGAN.

Witnesses:
R. M. TARLTON,
P. H. SWEDRIGLES.